United States Patent [19]

Biffle et al.

[11] Patent Number: 4,625,077

[45] Date of Patent: Nov. 25, 1986

[54] TELEPHONE BRIDGE METHOD AND APPARATUS

[75] Inventors: Lewis L. Biffle, Phoenix; Chad R. Larson, Scottsdale, both of Ariz.

[73] Assignee: International Anasazi, Inc., Phoenix, Ariz.

[21] Appl. No.: 629,325

[22] Filed: Jul. 10, 1984

[51] Int. Cl.⁴ .................... H04M 11/00; H04L 27/08
[52] U.S. Cl. ...................................... 379/28; 375/98; 379/94
[58] Field of Search ............................ 179/2 DP, 5 R; 340/825.02, 825.08; 455/5, 219, 225; 375/98; 381/104, 105, 108

[56] References Cited

U.S. PATENT DOCUMENTS

| | | | |
|---|---|---|---|
| 3,886,454 | 5/1975 | Oakley et al. | 455/5 X |
| 4,149,030 | 4/1979 | Foreman | 179/2 DP X |
| 4,512,033 | 4/1985 | Schrock | 455/5 X |

OTHER PUBLICATIONS

*Electronics*, Jun. 1954, pp. 186-188, "Sequentially Gated Automatic Gain Control", by Marcus Eliason.

*Primary Examiner*—Keith E. George
*Attorney, Agent, or Firm*—Limbach, Limbach & Sutton

[57] ABSTRACT

An improved telephone bridge apparatus of the type in which a plurality of remote stations communicate with a local station over a plurality of phone lines, wherein each of the plurality of phone lines is assigned to a different one of the plurality of remote stations. Each phone line is connected to an input channel, and each input channel is summed at a summing point, and the collective signal is supplied to a modem. Each phone line is connected to an output channel, each output channel receiving the same broadcast message from the modem. The modem, in turn, is connected to a controller, which communicates with the local station and which polls the remote stations according to a predetermined priority. The improvement includes monitoring means for measuring the signal levels being transmitted along each input channel, and signal level modifying means positioned in the signal paths of each input channel for modifying the level of the signal being transmitted thereto.

19 Claims, 8 Drawing Figures

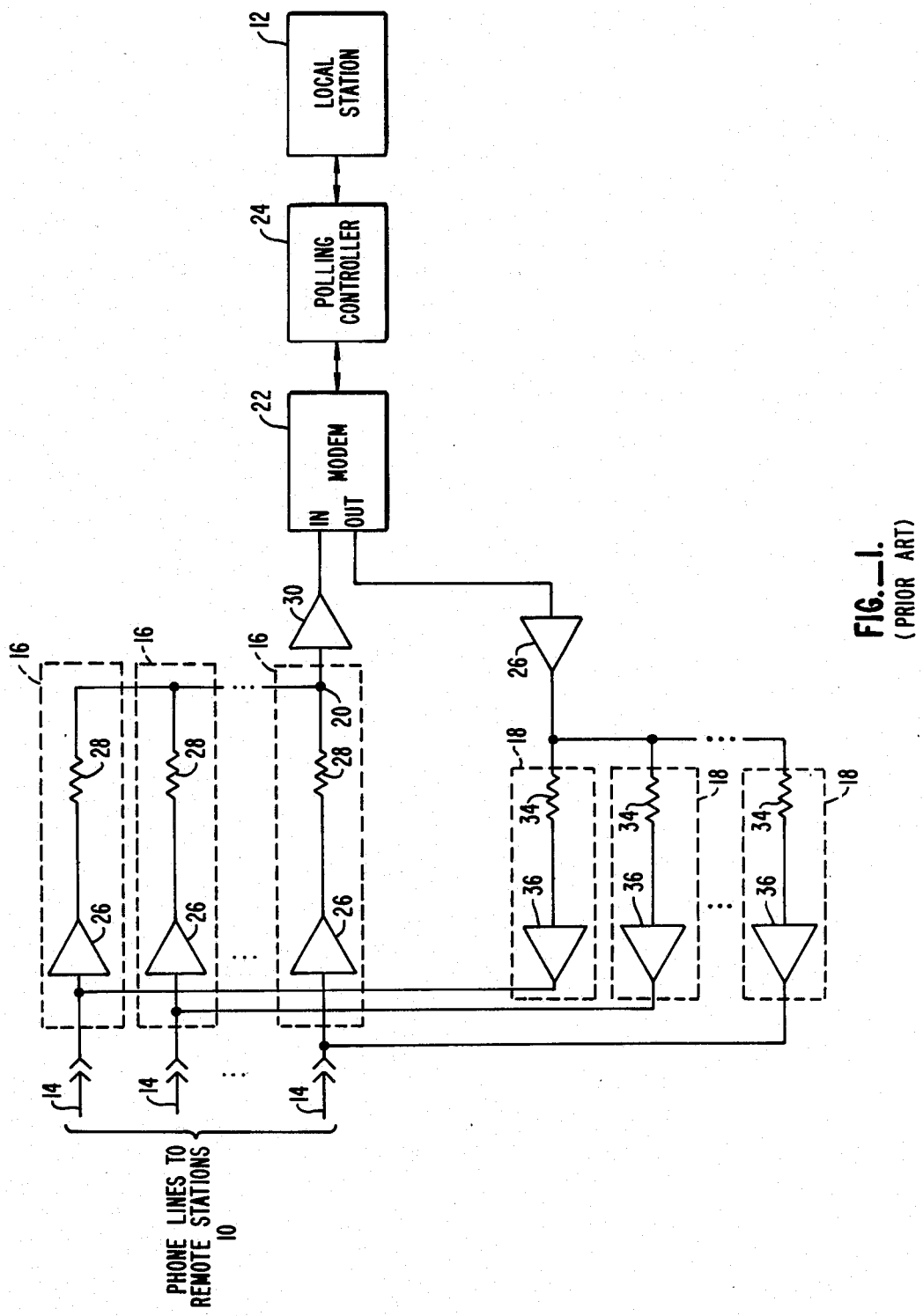

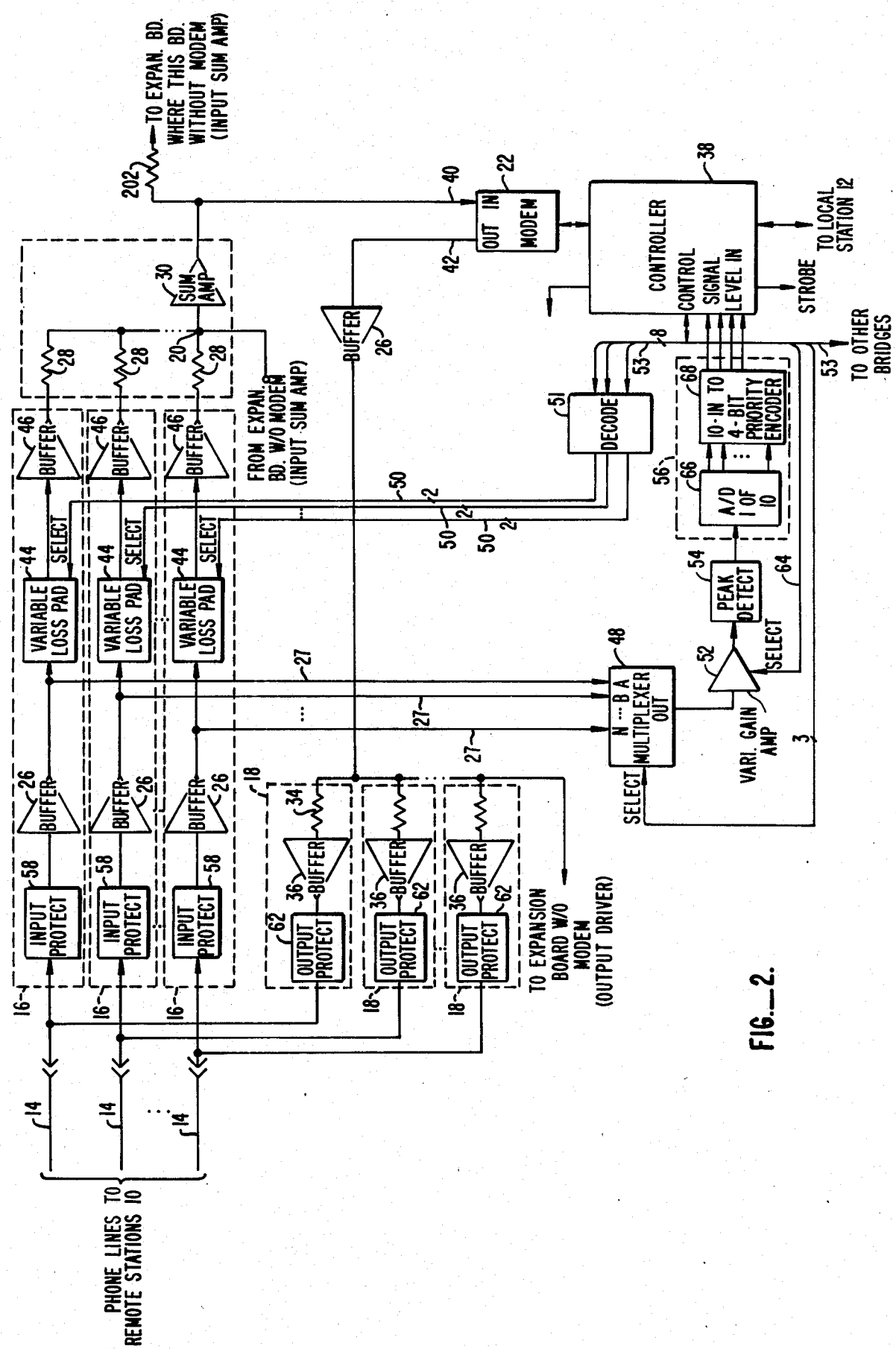
FIG._2.

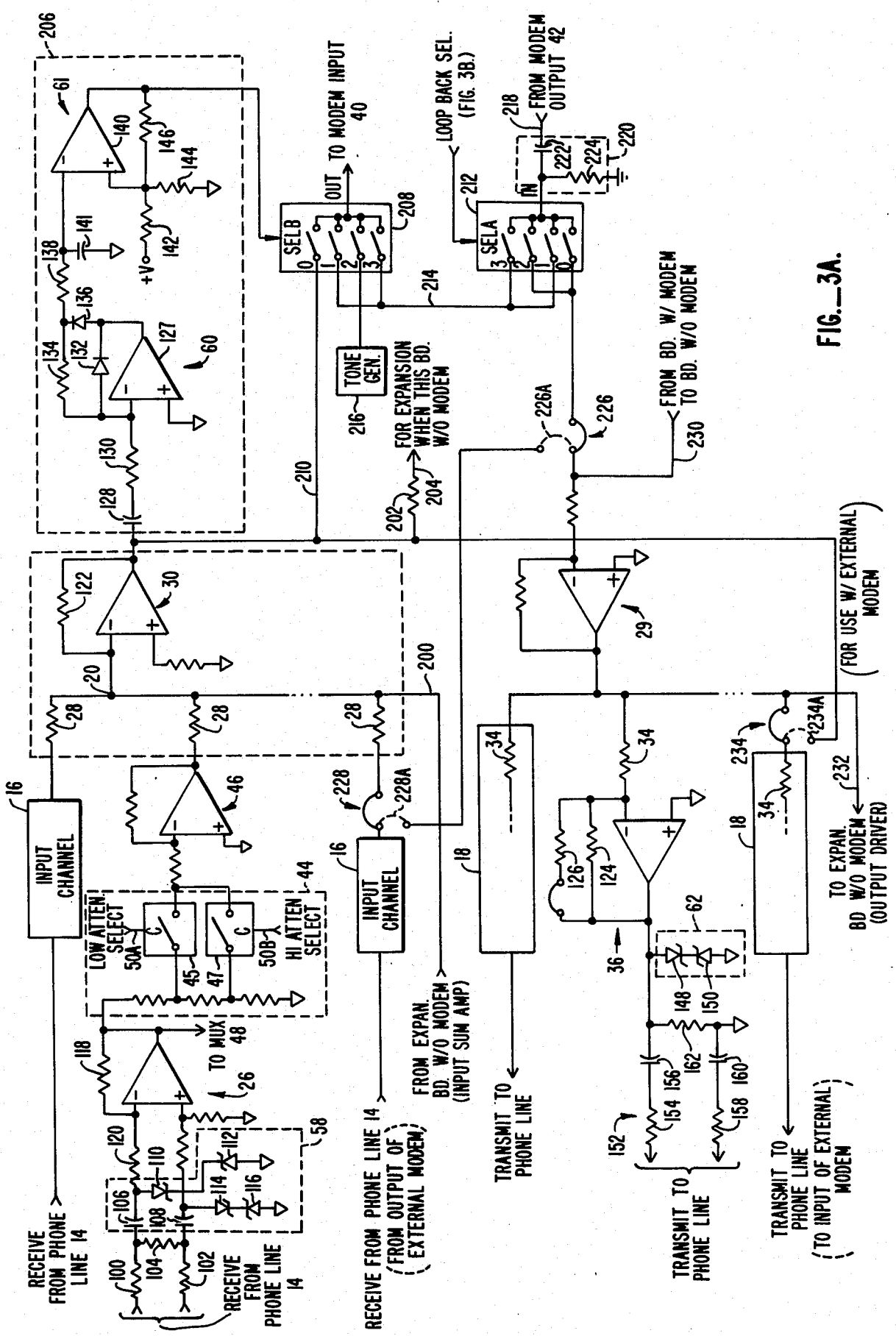
FIG._3A.

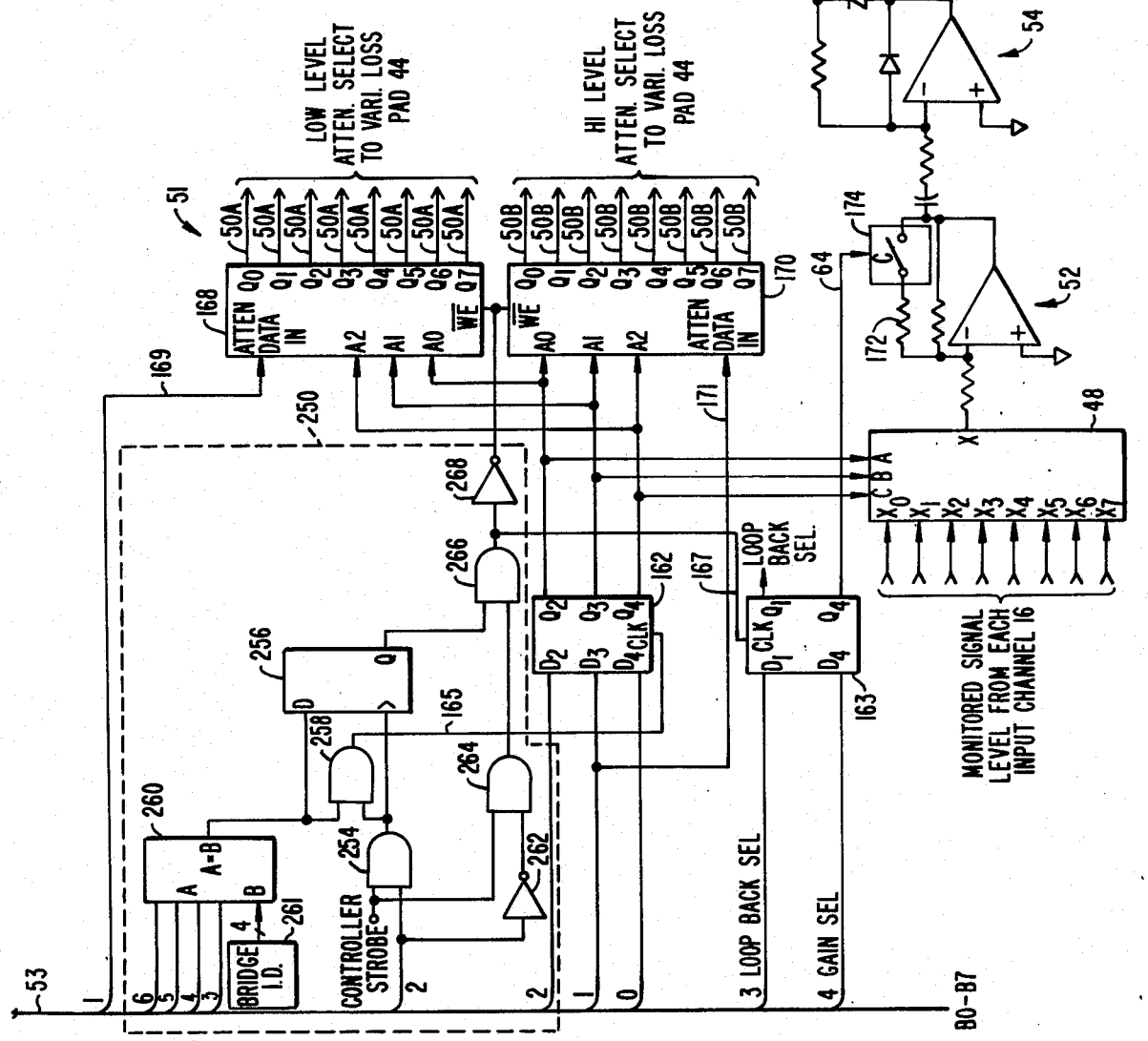
FIG._3B.

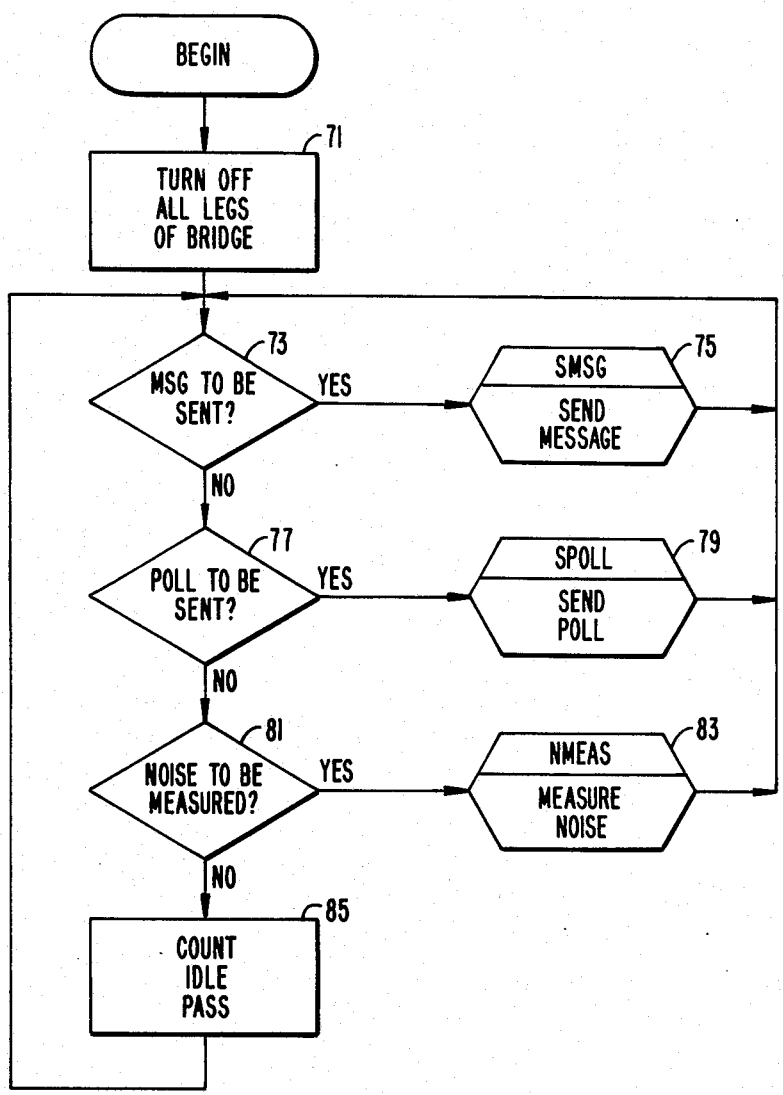
FIG._4.

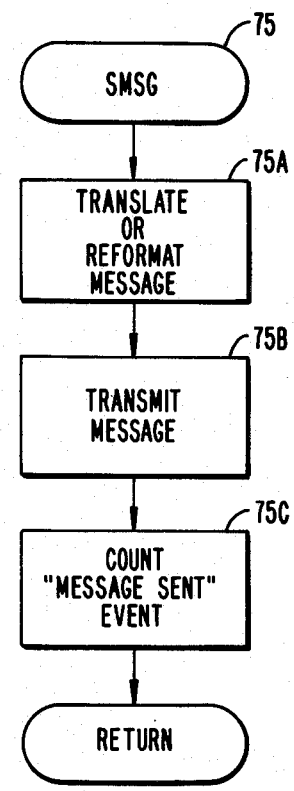
FIG._5A.

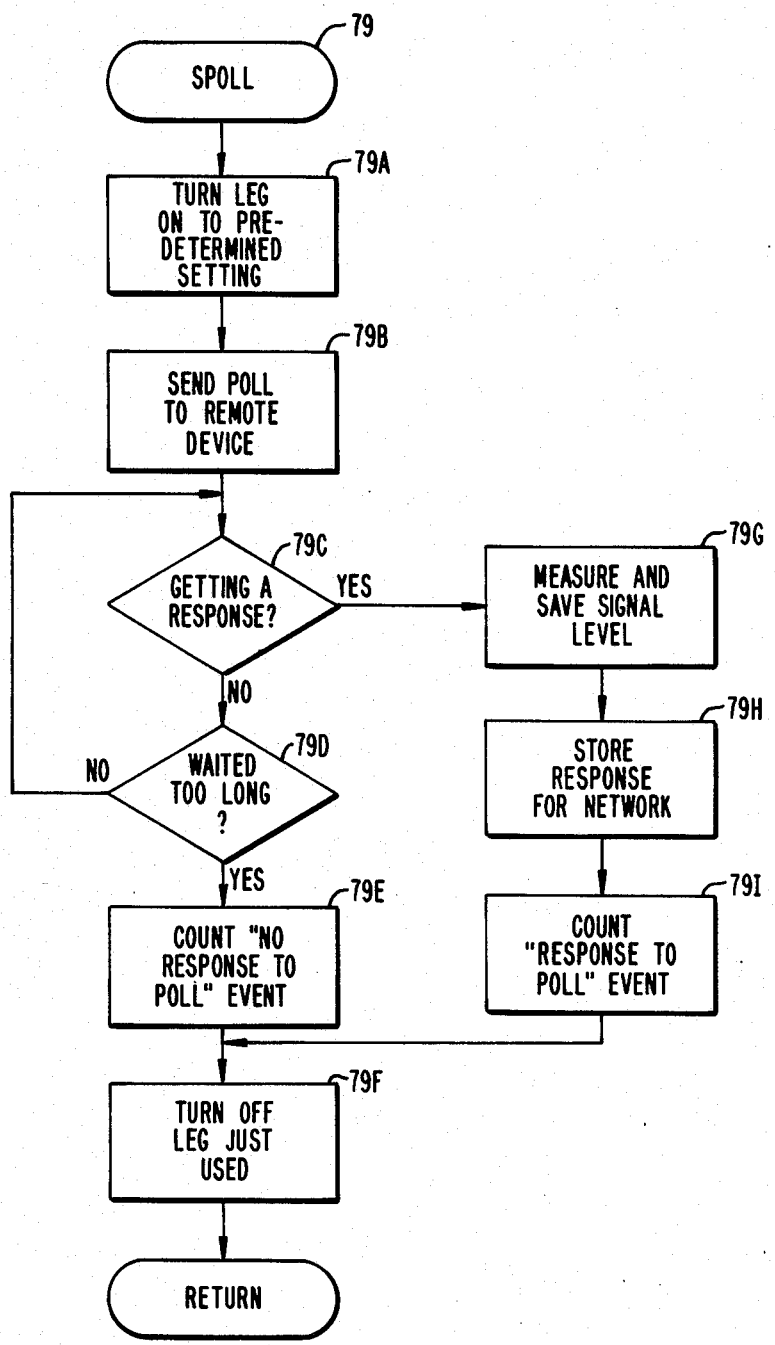
FIG._5B.

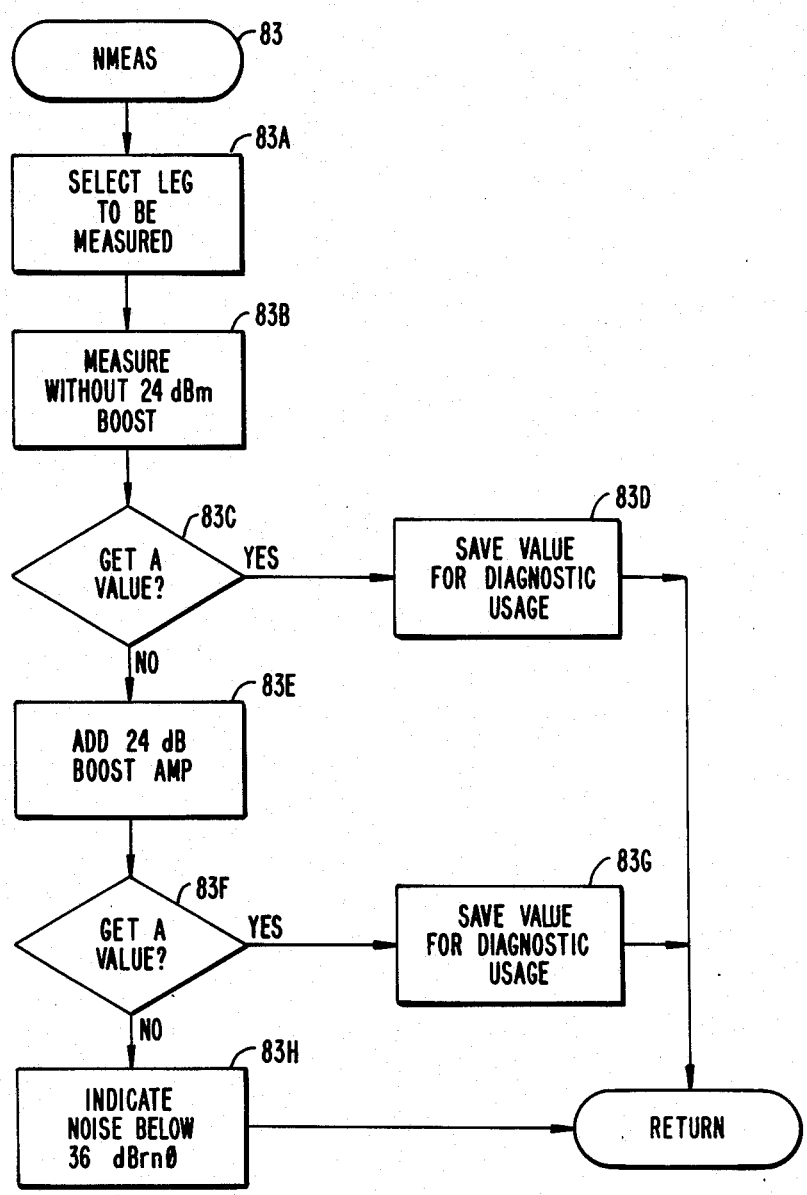
FIG._5C.

TELEPHONE BRIDGE METHOD AND APPARATUS

DESCRIPTION

1. Technical Field

The present invention is directed, generally, to communication over telephone lines, and more particularly to a telephone bridge for use in multidrop applications.

2. Background Art

It is often the case that a central computer, or other data processing installation, communicates with a multiplicity of remote stations, each such remote station being connected to the local station by way of a separate phone line. Thus, a single line, which is connected to the local station or computer, is split into a number of identical channels. Each channel, in turn, is connected to one of the phone lines to which a remote station is connected. Thus, the remote station at the end of each of the phone lines receives the same signal from the local station that any of the other remote stations receive.

Similarly, the signals from each of the remote stations, via the phone lines, are summed together and the sum is provided to the local station or computer by way of a modem. The above is called a "multidrop" arrangement.

It is to be understood that, in the telecommunication system being described, the signal that is transmitted across the phone lines between the remote stations and the local station is an analog signal. Thus, a modem is employed to receive the analog signals from the phone lines and to convert the signals into a digital format that is compatible with the format of the local computer or station. It is also to be understood that at each of the remote stations, there is a modem-like interface that converts the analog signals received from the phone line into a digital format compatible with that of the remote station computer. Similarly, the modem-like device converts digital signals received from the remote station computer into an analog form for transmission over its associated phone line.

With such a structure, all remote stations are able to hear the signals being broadcast by the local station modem and, likewise, the local station modem is able to hear the signals being provided by each of the remote stations.

There are a number of disadvantages of such a telecommunications structure. For example, transmissions from devices which are operating erratically will disrupt transmissions from the other remote stations. In a "multidrop" arrangement, as described above, since the local station modem will hear signals from any device on any of the phone lines, if one device "locks up" with its transmitter continuously transmitting, the local station modem will be unable to hear signals from any of the other devices. Despite the fact that only a single device is failing, the entire group of devices is not able to function.

In the past, manual intervention was required to stop the failing device from interfering with the operation of the rest of the phone lines. A person was typically required at the location of the malfunctioning device to disable it by unplugging it or by pressing a reset button. In some cases, a person can manually disconnect the phone line by inserting a patch cord in a phone line patch panel at the user's facilities. Typically, the phone company will not disconnect the phone line since the problem is not being caused by the phone company equipment.

Another disadvantage of prior telephone bridge structures is due to the inherent noise component present on any phone line. In the past, the amount of noise present on the phone lines had a direct impact upon the cost of a multidrop arrangement to the customer or user.

Phone equipment noise typically takes the form of hisses, pops, tones and other unwanted sounds. These noises can produce problems in the operation of the phone lines if the noises are loud enough. Modems can tolerate noises that are not very loud, or are of specific types. The maximum amount of noise of a specific type that will be present on a specific type of phone line is published and guaranteed by the phone company.

Modems are designed to operate in accordance with the specifications, and a modem that is designed to operate on a specific type of phone line will work well with such a phone line at the maximum permitted levels of noise for that type of line. However, when the noise from a plurality of such phone lines are summed together, the resulting noise can often exceed the maximum permitted levels. For example, if one has two phone lines that each exhibit noise characteristics at the maximum levels permitted by the phone company specification, the sum of the noise on these phone lines exceeds the level at which the modem manufacturer has designed its modem to operate successfully. If many of these such lines are connected together in a multidrop arrangement, the resulting noise level will invariably exceed the maximum design level for the particular modem.

In the past, this situation was remedied by the phone companies by utilizing particularly noise-free lines. Not unexpectedly, these "good" lines are more expensive than normal lines. In the typical application, a number of normal lines and a number of good lines are connected together such that the sum of the noise produced by all lines falls below the required maximum level.

The above solution, however, does not guarantee a functioning system over the long term. For example, if the noise level on one of the normal lines increases through normal deterioration, the collective noise level of the multidrop line can well exceed the published specifications.

There is, therefore, a need for a telephone bridge which permits the connection of a plurality of phone lines, wherein it is not required that the phone lines be of high quality, into a multidrop arrangement wherein the quality or functionality of any one such phone line does not affect the functioning of the other phone lines in the multidrop arrangement.

DISCLOSURE OF THE INVENTION

These and other problems of prior telephone bridges are overcome by the present invention of a bridge apparatus and method implemented thereby which includes input and output channels, wherein the input channels can be controlled to enable or disable arriving signals, or to modify the signal levels of such signals, as a function of the quality of the arriving signals.

The present invention includes signal level modifying means which are positioned in each of the input channels, signal level monitoring means which measure the level of the arriving signals, and means for controlling these signal level modifying means as a function of the signal levels measured by the monitoring means so that the signal provided to the modem from each of the input channels falls within a predetermined range of signal levels.

With such a structure, should the noise on a particular channel increase above a specified level, the controlling means can instruct the modifying means to turn off the offending channel. As such, the offending line can no longer affect the operation of the other good lines.

The present invention is intended to be employed in connection with a controller which directs the access by the remote stations to the local station. Such a computer acts as an arbitrator or traffic cop. Typically, the controller has a priority listing for access by the remote stations to the local station. The controller, in accordance with the priority listing, polls the highest priority remote station on its list to determine whether such station desires to communicate with the local station. All other remote stations are required to defer to the station with the highest priority. This polling signal is applied to the phone lines via the modem, and all remote stations hear the signal. After a predetermined amount of time, should the polled station not respond, the controller polls the next station of next highest priority on its list. This continues until a remote station responds. The controller is cognizant of the transmission protocol of each remote station, and thus formats its poll accordingly, and interprets the transmission received from a responding remote station in order to provide a signal to the local station which is understandable thereto.

In accordance with the present invention, such a controller can be upgraded to perform the monitoring, selecting and controlling functions described above.

It is therefore an object of the present invention to provide a telephone bridge which implements a multi-drop arrangement in which the input channels are controllable.

It is another object of the present invention to provide a telephone bridge having a plurality of input channels and a plurality of output channels wherein the signal level on any input channel can be independently controlled.

It is a still further object of the present invention to provide a telephone bridge having a plurality of input channels and a plurality of output channels wherein the signal level on any of the input channels can be controlled so that excessive noise on one or a number of input channels can be controlled to prevent such noise from interfering with the operation of the other input channels.

It is still another object of the present invention to provide a telephone bridge having a plurality of input and output channel wherein each input channel includes a controllable signal level modifying means and a signal level monitoring means, and further wherein the operation of the signal level modifying means is controlled in accordance with the signal level measured by the signal level monitoring means so that the signal level provided by each input channel to the modem falls within a predetermined range.

These and other objectives, features of the present invention will be more readily understood upon consideration of the following detailed description of certain embodiments of the present invention and the accompanying drawings.

BRIEF DESCRIPTION OF THE DRAWINGS

FIG. 1 is a functional block diagram of prior telephone bridges.

FIG. 2 is a simplified functional block diagram of the present invention.

FIGS. 3A and 3B/are simplified schematic diagrams of the input, and output channels, and the monitoring circuitry of the present invention.

FIG. 4 is a simplified flow diagram which illustrates the operation of the present invention.

FIGS. 5A, 5B, and 5C are simplified flow diagrams which illustrate the signal sampling and the attenuation select, the message sending, and the polling operations of the present invention.

DETAILED DESCRIPTION OF THE BEST MODE

Referring to FIG. 1, there is illustrated a typical voice frequency telephone bridge. There, a plurality of remote stations 10 are coupled to a local station 12 by way of a plurality of phone lines 14. Each phone line is coupled to the local station by way of an input channel 16 and an output channel 18. The signals from all of the input channels are summed at summing point 20 and the collective signal is supplied to the input of modem 22. Modem 22 converts the analog signal into digital form and supplies the signal to polling controller 24, which, in turn, supplies the signal to local station 12.

Each input channel includes a buffer amplifier 26 and a summing resistor 28. Each of the summing resistors 28 is connected to summing point 20. Summing point 20 is also connected to summing amplifier 30. Summing amplifier 30 is constructed in the conventional manner to provide a virtual ground characteristic to summing node 20.

For signals to be transmitted by local station 12, such signals are provided to polling controller 24 which, in turn, supplies such signals to modem 22. Modem 22 converts the digital formatted signals into analog form and applies such signals to a driver amplifier 26. At the output of driver amplifier 26, these signals are split into a number of identical signals, such signals being applied to each of the output channels 18.

Driving amplifier 26 in the output channel portion drives, for each output channel 18, a resistor 34 which is series connected to the input of buffer amplifiers 36.

As can be seen from the above structure, the amount of noise which is presented to the input of modem 22 is the sum of the noise present on all input channels 16. It can also be seen that with such a structure, the only way to prevent a malfunctioning line from interfering with the operation of the other input channels is to disconnect the offending line at the input of its corresponding input channel 16. Further, given the structure above, once the bridge is installed in a system, there is no convenient way for adjusting the signal level provided from each input channel 16 to summing point 20 so that the level provided to modem 22 is within an acceptable range.

Referring now to FIG. 2, the present invention will be described in greater detail. In connection with this description, the same reference numerals from FIG. 1 will be used in the ensuing figures when similar functions are being implemented by the referenced element.

As with conventional telephone bridges, phone lines 14 provide communication between stations 10 and local station 12. The bridge of the present invention provides a plurality of input channels 16 and a plurality of output channels 18. As before, a controller 38 passes binary information and instructions between the local station 12 and modem 22. In turn, modem 22 receives, at its input 40, a signal which is the sum of all signals being provided by input channels 16. Modem 22 supplies, at its output 42, a signal which is to be broadcast over all output channels 18.

Each input channel 16 includes a buffer 26 which drives a summing resistor 28. Likewise, summing resistors 28 are connected to summing node 20. Also connected to summing node 20 is summing amplifier 30 which provides a virtual ground to summing node 20. Similarly, a driver amplifier 26 drives, for each output channel 18, a resistor 34 which is series connected to a buffer amplifier 36.

However, this is where the similarity between prior telephone bridges and the present invention ends. First of all, the signal level on each channel is measured. Also, included in each input channel of the present invention is a variable loss pad which permits modification of the level of the signal being transmitted through each input channel 16. Variable loss pad 44 is connected to the output of buffer 26 and provides the level-modified signal to a buffer 46. In turn, buffer 46 provides the level-modified signal to summing resistor 28.

One of the input channels 16 will now be described in greater detail, it being understood that the other input channel 16 are constructed in a similar manner in accordance with the present invention. The amount of signal level modification provided by variable loss pad 44 is controlled by a select instruction supplied from controller 38 on select lines 50. As discussed above, the particular amount of modification selected for a particular input channel is chosen as a function of the signal level being transmitted along such input channel 16.

With respect to the signal level measurement, the output of buffer 26 is connected to a multiplexer 48 via line 27. The output of buffers 26 for each of the other input channels 16 are similarly connected to the input of the multiplexer 48. Multiplexer 48 is controlled by controller 38 to provide the signal from a selected channel as an output. This signal is applied to a variable gain amplifier 52 and then to a peak detector 54. Variable gain amplifier 52 provides a predetermined amount of gain boost to the signal in the event that the incoming signal on the selected input 16 falls below the desired operating range of peak detector 54.

Peak detector 54 provides a signal which is representative of the peak-to-peak level of the signal being measured. This level is supplied to analog-to-digital converter 56. Analog-to-digital converter 56 thereafter provides a digital signal to controller 38 which is representative of the signal level on the selected input channel.

The structure described above permits controller 38 to monitor the quality of the signal being received on each input channel and to modify the signal level on each of the input channels so as to bring the signal levels being applied to summing point 20 into an acceptable range. For example, if controller 38 determines through the monitoring chain that a remote station 10 is malfunctioning in a continuous transmission mode, the controller 38 can select a level of attenuation from the corresponding variable loss pad 44 which effectively turns off the corresponding input channel 16. Similarly, if controller 38 determines that the noise level on an input channel 16 has risen above that which is acceptable, controller 38 can also turn off that input channel 16.

Because each of the input channels can be independently controlled, controller 38 can turn all input channels off except for the input channel over which it expects a transmission. Thus, in the normal polling operation by controller 38 in sending out a poll to a remote station A, controller 38 would also turn off all other input channels 16, except for the input channel 16 which corresponds to the phone line for remote station A. In this manner, none of the other stations can interfere with the receipt of a transmission from remote station A to local station 12.

In operation, controller 38 maintains a priority table as with the previous polling controller 24. However, controller 38 also maintains a table of attenuation values correlated to each input channel. Thus, when the controller 38 polls a particular station, it concurrently selects an amount of attenuation in the corresponding variable loss pad 44 which, given the signal levels, will provide a signal level to summing node 20 which is within the acceptable range. During the current transmission from a selected remote station, when controller 38 senses that the signal level being received by the input channel 16 is different from the previous signal level, it will modify the amount of selected attenuation in the attenuation table so that on the next poll and transmission by that remote station, the new attenuation value can be used.

Referring to FIGS. 3A and 3B, a more detailed description of certain portions of the present invention will now be provided.

At the top left-hand corner of FIG. 3A it can be seen that input channel provides a differential input load to its associated phone line 14. It is well known that the standard telephone line comprises a twisted pair of conductors. Thus, in input channel 16, one end of resistor 100 is connected to one of the twisted pair of conductors, while one end of resistor 102 is connected to the other of the twisted pair of conductors. Connected in shunt between the other ends of resistors 100 and 102 is resistor 104.

In FIG. 2, it can be seen that each input channel provides an input protection circuit. From FIG. 3A, it can be seen that this input protect circuit includes a capacitor 106 connected at one end to the junction of resistors 100 and 104, and a capacitor 108 connected at one end to the junction of resistors 102 and 104. Series-connected, back-to-back zener diodes 110/112 and 114/116 are connected between ground and the other end of capacitors 106 and 108, respectively. Input protect circuit 58 suppresses any high voltage transient arriving on phone lines 14 and blocks any direct current.

The high-voltage transients referred to above can originate from any one of a number of sources, such as lightning strikes or user error in connecting the circuitry to other equipment. With the circuitry described above, the voltage levels applied to the inputs of buffer 26 can be prevented from exceeding the power supply levels to the buffer 26. As is well known in the art, should the input levels to an amplifier, such as an operational amplifier which is powered with specific power supply levels, exceed the power supply levels, the amplifier can be caused to function in an unpredictable manner. With the circuit structure described above, any failures due to misconnection or high voltage transients can be localized to an identifiable area and to components which are relatively inexpensive. Thus, should an excessive signal level be applied to the ends of resistors 100 or 102, these resistors will tend to fail first. Thus, the amplified components will be protected.

Buffer 26 can be seen to be a standard amplifier connected in a differential configuration. The gain provided by such an amplifier is related to the ratio of feedback resistor 118 to resistor 120.

Variable loss pad 44 can be seen from FIG. 3A to be preferably constructed as a voltage divider wherein the amount of voltage division achieved is determined by the closing of analog switches 45 and 47. These analog switches are controlled by signals on line 50 from controller 38. In the preferred embodiment of the present invention, variable loss pad 44 provides four levels of attenuation: 1) a minimal attenuation of approximately minus 2.5 dB when only switch 45 is closed, 2) a nominal amount of attenuation of approximately minus 18.5 dB when both switches 45 and 47 are closed, 3) a moderate amount of attenuation of approximately minus 33.2 dB when only switch 47 is closed, and 4) a substantial amount of attenuation of approximately 80 dB when both switch 45 and 47 are open. Preferably, buffer amplifier 46 provides a gain of approximately 18.4 dB. Thus the signal level provided to summing resistor 28 is related to the gain provided by buffer amplifier 26 and the attenuation provided by variable loss pad 44.

Referring now to the bottom of FIG. 3A, a representative output channel 18 will now be described. The signal from output 42 of modem 22 is amplified by buffer 29. Preferably buffer 29 is an inverting amplifier of conventional construction. The output of buffer 29 drives the inputs of output channels 18. For a representative output channel 18, buffer 36 first receives the signal from buffer 29. Buffer 36 is preferably an inverting amplifier. The output of buffer 36 is then supplied to output protect circuit 62.

Output protect circuits 62 in each of the output channels 18 comprise opposing, series connected zener diodes 148 and 150 which are connected in shunt across the output of amplifier 36. The breakdown voltages of these diodes are preferably selected to protect the output circuitry of amplifier 36. Protection for the output circuitry of amplifier 36 is desirable because of the high voltage transients that can occur on telephone lines, and also because of the potential for user misconnection of these lines.

For example, in the event of a lightning strike, voltages in the hundreds or thousands of volts can be presented on telephone lines 14 and hence can be propagated back to the output circuitry of amplifier 36. Similarly, the user can mistakenly apply a high voltage level, or a short circuit, to these output lines, thus subjecting the output circuitry of amplifier 36 to excessive signal levels. Output protection circuit 62, in conjunction with resistors 154 or 158, act to reduce these high voltage signals to levels which can be accommodated by the output circuitry of amplifier 36. As with the input protection circuitry described above, the output protection circuitry is designed so that any failures are localized to specific and inexpensive components. In this case, resistors 154 and 158 are selected to fail before any damage can be caused to the output circuitry of amplifier 36. For example, should the user mistakenly apply 110 volts to the telephone line, thus applying 110 volts to one end of resistor 154, a substantial amount of the voltage will be dropped across resistor 154. The series connected zener diodes 148 and 150 ensure that the output of amplifier 36 does not exceed their breakdown voltages. Thus, the output of amplifier 36 cannot be raised beyond the zener voltage level. Should the high voltage be applied long enough, resistor 154 or 158 will fail in an open condition, thus disconnecting the high voltage source from the output circuitry.

Each of the amplifiers shown FIGS. 2, 3A and 3B can be constructed using operational amplifier device type LF353, manufactured by National Semiconductor Corporation of Santa Clara, Calif. These include buffer amplifier 26, buffer amplifier 29, buffer amplifier 46, summing amplifier 30, buffer amplifier 36, variable gain amplifier 52 and peak detector 54. For summation amplifier 30, the ratio of the feedback resistor 122 to input resistor 28 preferably provides a gain of approximately 7.4 dB. Buffer amplifier 29 preferably provides a gain of approximately 0 dB. With respect to buffer amplifier 36, the ratio of feedback resistor 124 to input resistor 34 preferably provides a gain of approximately 3.5 dB. A second resistor 126 can be jumpered for parallel connection with resistor 124 to preferably provide an attenuation of approximately minus 7.6 dB.

Referring to the output circuit 152 of output channel 18, it can be seen that a balanced output is provided to accommodate the twisted pair conductor configuration of telephone lines. Resistor 154 is connected in series with capacitor 156, while resistor 158 is connected in series with capacitor 160. The other ends of capacitors 156 and 160 are connected to opposite ends of resistor 162. The combination of these elements provide the appropriate loading that the phone line expects to see.

FIG. 3A illustrates additional features which improve the performance of the present invention over telephone bridges of the prior art. Among these features are the ability to provide an expansion of the number of telephone lines which can be accommodated in a parallel, as opposed to serial, mode; an arrangement by which slow response modems can be made to respond quickly; and an arrangement by which either an on-board modem or an external modem can be conveniently connected for use with the present invention.

With respect to the parallel expansion capability, access to summing mode 20 is provided by line 200 to a point which is externally accessible. Thus, the output of a summing amplifier connected to additional input channels can be connected to line 200 and thus be summed with the existing input channel signals.

In FIG. 3A, the output of summing amplifier 30 is shown connected to resistor 202 which, in turn, is connected in series with line 204 that is externally accessible by the user. In the preferred embodiment of the present invention, for production considerations, each set of input channels and summing amplifier is provided with the user accessible line 200 to the summing node 20, and with the user accessible line 204 to the output of summing amplifier 30. With the user accessible line 204, the input channels and summing amplifier can be used as an expansion board. Thus, a board containing the above-described circuitry can be utilized to provide additional input channels, with line 204 of such a board being connected to line 200 for the already existing input channels. In such a case, resistor 202 acts as a summing resistor.

Similarly, the output channels are configured to permit expansion of the number of output channels in parallel. Jumper arrangement 226 permits the connection of the input of driver amplifier 29 to an external signal source, via line 230. The signal applied at this point can come from the output of a similar driver amplifier 29 from another set of output channels. It can be seen from FIG. 3A, that the output of driver 29 is also connected to line 232 which is externally accessible. This line can be connected to line 230 for the output channels on another board. As with the input channel circuitry above, in the preferred embodiment of the invention, the output channels will be configured to have externally accessible lines 232 and line 230 so as to permit parallel expansion of the output channels.

With respect to the second additional feature described above, reference is made to FIG. 3A. In the upper right-hand corner thereof is illustrated a carrier detection circuit 206. This circuit determines when a transmission from a modem on one of the input channels is present. The carrier detect circuit includes a peak detector 60 and a comparator 61. When the level detected by peak detection circuit 60 exceeds the reference level set by resistors 142 and 144, comparator 61 provides a carrier detected signal to load a mode select circuit 208.

Mode select circuit 208 receives input signals from three sources: (1) the output of summing amplifier 30, via line 210, (2) the loop-back select circuit 212, via line 214, and (3) a tone generator 216. Loop-back select 212 receives its input from modem output 42 via line 218 and high pass filter 220. High pass filter 220 is formed by series-connected capacitor 222 and shunt resistor 224.

In the preferred embodiment of the present invention, mode select circuit 208 and loop-back select circuit 212 can be an analog multiplexer, such as device No. 4052B manufactured by Radio Corporation of America of Somerville, N.J. Such a device provides two banks of four analog switches each, the closure of a switch in each bank being determined by the logic states on select lines A and B. This configuration can be seen within blocks 208 and 212 of FIG. 3A. There, modem input 40 is tied to the common ends of the switch bank in block 208. Switch zero of the block receives the summed signal from the input channels, on line 210. Switches 1 and 3 receive signals supplied by switches 1 and 3 of the bank of switches in block 212. Finally, switch 2 receives a signal from tone generator 216.

The bank of switches in block 212 receive at their common connection point the signal from modem output 42. Switches 0 and 2 are connected to jumper arrangement 226.

Select signal B is supplied from the output of carrier detect circuit 206. Select signal A is supplied from loop-back select line from the controller 38.

Referring to Table A,

TABLE A

| SELECT LINES | | SWITCH | |
|---|---|---|---|
| B | A | CLOSURE | RESULT |
| 0 | 0 | 0 | Normal Operation: Signal from input channels supplied to modem input Signal from modem output supplied to output channels |
| 0 | 1 | 1 | Output Loop-Back: Output of modem looped back to input of modem |
| 1 | 0 | 2 | Standby: Output of modem connected from output channels Tone supplied to input of modem |

TABLE A-continued

| SELECT LINES | | SWITCH | |
|---|---|---|---|
| B | A | CLOSURE | RESULT |
| 1 | 1 | 3 | Output Loop Back: same as 0, 1 case | the selection of switch connections will not be discussed. When select lines A and B both have a logic 0 applied thereto, switch 0 will be closed. Thus, a normal operation will be selected. The signal from modem output 42 will be connected to the output channels via jumper arrangement 226. The signal from summing applifier 30 will be connected to modem input 40.

When select line A has a logic 1 applied to it and select line B has a logic 0 applied to it, switch 1 will be selected for closure. In this condition, the signal on modem output 42 will be looped back to the input of modem 40. This configuration is helpful in testing the operation of the modem.

When select line A is a logic 0 and select line B is a logic 1, switch 2 is selected for closure. In this condition, modem input 40 will be supplied with a signal from tone generator 216 and the signal from modem output 42 will be connected from the output channels 18. In this mode, the modem 22 thinks that it is receiving a carrier signal from its input channels, and is thus kept in a state of readiness.

Finally, when both select lines A and B are at a logic 1, the signal from modem output 42 will be looped back to the modem input 40, as was the case when switch 1 was selected for closure.

From the above arrangement it can be seen that, if during periods when no signal is actually being received from the input channels, the modem 22 will be in a condition to respond quickly to any actual signals being received, if it is supplied with such signals. The signals supplied to it in this mode from tone generator 216 keeps modem 22 in a state of readiness, and bypasses the initial response delay for the modem which would have been present had no tone been supplied to the modem input prior to receipt of the actual carrier signal from an input channel.

In light of the above, the role of carrier detect circuit 206 can now be better understood. Upon detection of a carrier from the input channel 16, carrier detect circuit 206 will supply a logic 0 to select line B. This will cause a normal operation configuration to be assumed, and thus will cause the input from summing amplifier 30 to be supplied to the modem input 40.

In FIG. 3A it can be seen that peak detector circuit 60 is an active rectifier arrangement. An operational amplifier 127, such as device type LF353 referred to above, receives the summed signals from input channels 16 by way of series-connected capacitor 128 and resistor 130. Capacitor 128 acts as a DC blocking capacitor while resistor 130 affects the gain of peak detector circuit 60.

Amplifier 127 is connected in an inverted mode so that the summed signals are applied to the inverting input of amplifier 127 and diode 132 is connected between the inverting input and output of amplifier 127. Further resistor 134 is connected at one end at the inverting input of amplifier 127 and connected at the other end to the cathode of diode 136. The anode of diode 136 is connected to the output of amplifier 127. The junction of diode 136 and resistor 134 is coupled, via resistor 138, to driver 61 to provide the signal to input 40 of modem 22. The above described configuration, provides a well-known active, half-wave rectifier.

The other end of resistor 138 is connected to the inverting input of amplifier 140. Capacitor 141 is connected between the junction of resistor 138 and amplifier 140 and ground. The output of amplifier 140 is fed back to the non-inverting input thereof via resistor 146. Resistors 142 and 144 provide a voltage reference to the non-inverting input of amplifier 140. The above comprises a comparator circuit 61. Capacitor 140, in conjunction with resistor 138 provides a low pass filtering function. Upon receipt of a signal on an input channel with a level that exceeds the reference level supplied by resistors 142 and 144, comparator 61 will supply a logic zero output to mode select circuit 208 to cause the present invention exit out of it standby mode and to enter a normal operating mode.

Thus it can be seen that the above arrangement permits a slower modem to be placed in a state of readiness such that when an input signal is actually present, the modem will be able to begin decoding the signal immediately without having to go through a start-up sequence.

With respect to the third feature, that of connecting an external modem, jumper arrangements 226, 228, and 234 are employed.

In the preferred embodiment of the present invention, where an external modem is desired to be used, jumper 226 will be modified so that the dotted line portion 226A will be connected and all other portions will be disconnected. Similarly, dotted portion 228A of jumper arrangement 228 and portion 234A of jumper arrangement 234 will be similarly connected. As such, the output of the external modem can be connected to the input channel in which jumper arrangement 228 resides, and the input to the external modem can be connected to the output of the output channel in which jumper arrangement 234 resides. From FIG. 3A it can be seen that, when jumper portions 226A, 228A and 234A are connected, the output of summing amplifier 30 will be connected to the output channel for which jumper arrangement 234 is associated, and the output of the external modem will be supplied to the input channel with which jumper arrangement 228 is associated and to output driver amplifier 29, via jumper portion 226A. As such, one channel or leg of the bridge will be modified for use as input and output circuits for the external modem.

Referring now to FIG. 3B, the signal level monitoring control and the attenuation level select circuits will now be described in greater detail.

As discussed earlier, control signals are received from controller 38 by decode circuit 51, variable gain amplifier 52 and multiplexer 48. In FIG. 2 these signals are supplied on lines 53 and 64. In FIG. 3B it can be seen that these control signals are initially stored in latches 162 and 163 in accordance with clock signals 165 and 167. Latch 163 supplies the output which controls the gain selection in variable gain amplifier 52 and the selection of the loop back mode described earlier. The outputs of latch 162 supply addresses for specifying the channel in latches 168 and 170 which is to be set in accordance with the logic state on attenuation data lines 169 and 171, respectively. These latches 186 and 170 can be addressable latch device type 4099 manufactured by Motorola, Inc. of Phoenix, Arizona. The outputs of latches 168 and 170 determine what level of attenuation is to be provided by variable loss pad 44. Because in the preferred embodiment only one input channel is being operated upon at a time, the same control signals used to select the channel for which the current attenuation is specified for the variable loss pad 44, can also be used to control multiplexer 48 to select the appropriate signal (i.e. channel) for measurement. Thus, the outputs of latch 162 is shown also connected to the control inputs of multiplexer 48.

In the embodiment shown in FIG. 3B, for the input channel 16 which is currently being monitored, controller 38 will supply control signals on attenuation data lines 169 and 171 such that: 1) where a low level of attenuation is desired, the appropriate outputs of latches 168 and 171 are energized to cause switch 45 to be closed and switch 47 to be open; 2) where a nominal amount of attenuation is desired, the appropriate outputs of latches 168 and 170 will be energized to cause both switch 45 and 47 to be closed; 3) where a moderate amount of attenuation is desired, the appropriate outputs of latches 168 and 170 will be energized to cause switch 47 to be closed and switch 45 to be open; and 4) where high attenuation is desired, none of the outputs of either latch will be energized so that switches 45 and 47 are both open.

In the preferred embodiment of the present invention, the selection of the channels to be monitored, the selection of the channels for which the attenuation is to be applied, and the supplying of data and commands can be provided over the same lines. In order to do this, circuitry is provided for differentiating between data/commands or select information. Furthermore, in the preferred embodiment of the present invention, it is envisioned that two or more bridges can be controlled by the same controller 38. Thus, circuitry is provided by which the controller can select channels or specified data/command for all, some, or one of the plurality of bridges which it controls.

With respect to the select versus data/command feature, the upper left-hand corner of FIG. 3B illustrates selection circuit 250 and bus 53. Selection circuit 250 supplies the clocks to latches 162 and 163, as well as the write enable signals to latches 168 and 170. When a select mode is detected by selection circuit 250 on bus 53, the appropriate clock signal is supplied to latch 162 so that it stores the select information being supplied on bus 53. At the same time, the write enable signal to latches 168 and 170, as well as to latch 163 are withheld, thus preventing data from being written into these latches.

Conversely, when select circuit 250 detects a data/command condition on bus 53, the appropriate clock is supplied to latch 163 to latch in the loop-back select and gain select commands, and the write enable signal is supplied to latches 168 and 170 to permit the attenuation data to be written to the addressed channel of the latches. Bus 53 can thus supply both address and data/commands.

In the preferred embodiment of the present invention, the most significant bit, i.e. bit 7, designates whether the information on bus 53 corresponds to select/address information, or data/commands. Controller 38 supplies a strobe to synchronize the acceptance of information from bus 53 by logic circuit 250. This strobe and bit 7 are applied to AND gate 254. The output of AND gate 254 is applied to the clock input of latch 256 and to one input of AND gate 258. The other input to AND gate 258 and the input to latch 256 are supplied from comparator 260. Comparator 260 receives, at one of its inputs, signals from bits 3 through 6 from bus 53. The other of the inputs to comparator 260 is a predetermined identification word, supplied by block 261, by which the particular bridge is uniquely distinguished from all other being controlled by controller 38. When bits 3 through 6 match the identification word, this indicates that the information being suppied over the bus 53 is intended for that bridge. As such, comparator 260 provides a logic 1 to the input of latch 256, as well as a logic 1 to AND gate 258. If bit 7 is a logic 1, and if the strobe from controller 38 is present, a logic 1 will be supplied to the clock input of latch 256. This causes the logic 1 value from comparator 260 to be stored in latch 256. Additionally, the output of AND gate 258 will be a logic 1 which will cause latch 162 to store the logic values present in bits 0 through 2 on bus 53. Thus, the channel select information is stored into latch 162.

Note also in this case that for a logic 1 value for bit 7, inverter 262 provides a logic 0 to AND gate 264. The other input to AND gate 264 is the strobe from controller 38. Thus, when bit 7 is a logic 1, the output of AND gate 264 is a logic 0. The output of AND gate 264 is applied to one of the inputs to AND gate 266. The other input to AND gate 266 is supplied from latch 256. Where the output of AND gate 264 is a logic 0, the output of AND gate 266 will likewise be a logic 0, because of the input supplied from latch 266. Thus, when bit 7 is a logic 1, thus implying a channel select condition, no clock will be supplied to latch 163 from AND gate 266 and thus no data will be clocked into latch 163. Similarly, the output of AND gate 266 is inverted by inverter 268 and then applied to the write enable inputs of latches 168 and 170. As indicated in FIG. 3B, the write enable inputs accept a logic 0 level to cause the writing of data into the latches. Thus, when the output of AND gate 266 is a logic 0, the signal applied to the write enable inputs of latches 168 and 170 will be a logic 1 and therefore prevent data from being written into the latches.

Conversely, when bit 7 is a logic 0, the output of AND gate 254 will be a logic 0 which will cause the output of AND gate 258 to be a logic 0, as well as prevent the output of comparator 260 from being clocked into latch 256. Thus, the states of bits 0 through 6 on bus 53 will not affect the channel or leg selections stored in latch 162 and the bridge select indication stored in latch 256. In turn, the logic 0 condition of bit 7, in the presence of the strobe from controller 38, will cause the output of AND gate 264 to assume a logic 1 level. This logic 1 level, in conjunction with the logic 1 level from latch 256, will cause AND gate 266 to provide a logic 1 level to line 167 and the clock input of latch 163, as well as cause inverter 268 to provide a logic 0 to the write enable inputs of latches 168 and 170. In turn, this causes the logic level present on bit 0 to be written into the selected channel of latch 170, the logic level present in bit 1 of bus 53 to be written into the selected channel of latch 168, and for the logic levels present on bits 3 and 4 of bus 53 to be written into latch 163.

In the above manner, data/commands can be differentiated from channel select or leg select information on bus 53.

The utilization of comparator 260 also permits controller 38 to communicate with other bridges sharing the same bus 53. This is because select circuit 250 will prevent the latches of non-selected bridges from responding to the information on bus 53. In the event that bit 7 is a logic 1, i.e. a select mode condition, but the logic states on bits 3 through 6 of bus 53 are different from the identification word 261 for a particular bridge, a logic 0 level will be supplied from comparator 260 and latched into latch 256. Simultaneously, AND gate 258 will provide an output logic 0 and hence prevent latch 162 from latching in any of the select information present on bus 53.

The presence of a logic 0 in latch 256 will prevent AND gate 266 from assuming a logic 1 state despite the fact that bit 7 goes to a logic 0 state and AND gate 264 thereafter supplies a logic 1. Thus, for information not intended for the particular bridge, select logic 250 will prevent the bridge from responding thereto. In the preferred embodiment of the present invention, table B specifies the role that each bit on bus 53 plays and the response of select logic circuit 250 thereto.

TABLE B

| BIT | STATE | DEFINITION |
|---|---|---|
| 0 | 0 | Leg select, when bit 7 = 1, or |
|   | 1 |   |
| 1 | 0 | attenuation data, when bit 7 = 0 |
|   | 1 |   |
| 2 | 0 |   |
|   | 1 |   |
| 3 | 0 |   |
|   | 1 |   |
| 4 | 0 | bridge select, when bit 7 = 1, or |
|   | 1 |   |
| 5 | 0 | commands, when bit 7 = 0 |
|   | 1 |   |
| 6 | 0 |   |
|   | 1 |   |
| 7 | 0 | Select mode |
|   | 1 | atten. data/command mode |

Comparator 260 can be device type 4063 manufactured by Motorola, Inc. of Phoenix, Ariz.

Referring to the bottom of FIG. 3B, multiplexer 48 can be an analog multiplexer device type 4051, manufactured by Motorola, Inc. of Phoenix, Ariz. The output of multiplexer 48 is supplied to variable gain amplifier 52.

Variable gain amplifier 52 is constructed in the conventional inverting amplifier mode with an additional resistor 172 which is connectable in parallel in the feedback path by way of an FET switch 174. FET switch 174 is turned on and off by a signal from controller 38 on line 64. It is to be understood that although line 64 is shown in FIG. 2 to originate directly from controller 38, in the preferred embodiment, this signal is first stored in latch 163.

The output of variable gain amplifier 52 is coupled to peak detector 54. Peak detector 54 utilizes an active half-wave rectifier. The rectifier structure used here is substantially similar to peak detector circuit 60 described above. However, given the signal levels provided out of variable gain amplifier 52, the active half-wave rectifier provides an output which is proportional to the peak level of the signal present on the input channel being monitored. The output of peak detector 54 is filtered by the low pass filter formed by resistor 176 and capacitor 178. The filtered signal is then applied to the input of analog-to-digital converter 56.

Referring to analog-to-digital converter 56 of FIG. 2, such a converter can be constructed using a one of ten analog-to-digital converter 66 and a 10-in to 4-bit priority encoder 68. See FIG. 3B. The one of ten analog-to-digital converter 66 can be device type LM3915, manufactured by National Semiconductor of Santa Clara, Calif. This device is intended for audio frequencies and activates one of ten outputs depending upon the level of signal being applied at its input.

The 10-in to 4-bit priority encoder 68 can be device type 74LS147, manufactured by Signetics Corporation of Sunnyvale, Calif. or device type CD40147, manufactured by RCA of Summerville, N.J. See FIG. 3B. The 10-in to 4-bit priority encoder 68 receives the outputs from one of ten analog-to-digital converter 66 and in response to the particular output being energized therefrom, provides a binary coded decimal (BCD) word to controller 38. This BCD word indicates to controller 38 which of the ten levels from the one of ten analog-to-digital converter 66 is present on the input channel 16 being monitored.

Referring now to FIG. 4, the operation of the present invention will now be described in greater detail. As discussed above, controller 38 acts as a traffic cop to control incoming and outgoing messages, and the order in which remote station obtain access to the local station 12. Thus, the controller starts first with all input channels, or "legs", of the bridge turned off, step 71. Next, it determines whether the local station 12 desires to send a message, step 73. If a message is to be sent, step 75 is executed. If not, step 77 is processed.

In step 77 it is determined whether it is time to poll the remote stations. If yes, a poll is sent in step 79. If no, it is determined whether the signal level present on the input channels is to be measured. See step 81. Step 83 is executed if a measurement is to be taken. Otherwise, step 85 is executed to record the fact that no messages or polls were sent nor measurements taken on the current pass, and thereafter the controller 38 returns to step 73.

Referring to FIG. 5A, message send step 75 "SMSG" will now be described in greater detail. In step 75A, the information to be sent is translated or reformatted into a form which is understandable to the remote station 10 to which it is to be sent. Step 75B is next executed in which the message is supplied to modem 22 and hence broadcast over output channels 18. In step 75C controller 38 records the transmission as a message sent event. Thereafter controller 38 returns to the main processing loop of FIG. 4.

Referring now to FIG. 5B, send poll step 79 will be described in detail. In step 79A the input channel, or leg, is turned on which corresponds to the remote station 10 to be polled. The poll is next sent to the desired remote station in step 79B. Step 79C is then executed in which controller 38 looks for a response from the polled remote station 10. If no response is detected, step 79D is processed to determine whether a predetermined time period has elapsed. This time period is typically set according to the application of the bridge and the preference of the user. Where there is a low rate of traffic, this time can be long. On the other hand, where there is a high rate of traffic, only a short time period without a response from the polled remote station can indicate that the remote station does not wish to transmit at this time.

If, in 79D there is still time remaining for receipt of the response, step 79C is processed again. If, on the other hand, the time has expired, step 79E is processed in which a "no response" event is recorded. Thereafter, the input channel is turned off, step 79 F, and the controller returns to the main processing loop of FIG. 4.

On the other hand, if a response is detected in step 79C, the appropriate command is sent to multiplexer 48, FIGS. 2 and 3B, to cause the signal level present to be measured. Step 79G. The measure level is then stored for later use, step 79H. Finally, a "response to poll" event is recorded in step 79I, and thereafter, the current input channel is turned off, step 79F.

Referring now to FIG. 4C, the noise measurement step 83 will now be described in greater detail. Noise measurement step 83 can be utilized during periods of low traffic, or periodically to verify that the noise on the input channels has not increased to excessive levels. In step 83A the input channel to be monitored is selected. In step 83B a measurement is taken with variable gain amplifier 52 in its low gain setting. If a reading is obtained in step 83C, the value is saved for later diagnostic use. See step 83D. On the other hand, if no reading is obtained, the high gain setting is selected in variable gain amplifier 52, step 83E, and inquiry is again made as to whether a reading is obtained. See step 83F. If yes, the value is saved, step 83G for diagnostic use. If no, step 83H is executed to indicate that the noise is below some predetermined level, for example, 36dBrn0. Thereafter, controller 38 returns to the main processing loop of FIG. 4.

In accordance with present invention, controller 38, as a part of its operation, designates which of the remote stations 10 will be permitted to transmit to the local station 12 at any given time. To do this, controller 38 accesses a priority list and, in accordance with the priority list, transmit via modem 22 and output channels 18 a message which designates the particular remote station 10 which is being assigned access to local station 12. This message is formatted according to the protocol expected by the particular remote station. The other remote stations, not recognizing the broadcast authorization, will refrain from transmitting across the respective phone lines 14. In steps 83D and 83G of FIG. 5C, and in step 79G of FIG. 5B, a diagnostic usage of the measured signal and noise levels is indicated. There, the signal and noise levels are compared to the desired signal level for the particular channel and, from this comparison, an attenuation level is selected for use in variable loss pad 44. This attenuation level is stored in correlation with the particular remote station and its associated channel. On the next transmission by that remote station, the newly selected attenuation level will be implemented in variable loss pad 44. Preferably, the calculated attenuation level will not be implemented during the current transmission in order to avoid unduly disrupting the operation of modem 22.

In the above manner, controller 38 polls the remote stations 10, giving each station an opportunity to communicate with local station 12 and, with each transmission from such remote station, measuring the input signal level on the associated input channel, and determining an attenuation level to be used for the next transmission by that remote station.

With the above-described structure and operation, the present invention provides a telephone bridging system which is far superior to prior telephone bridging systems. For example, in the event that one of the telephone lines begins to malfunction or provides a noise level which exceeds the desired noise level, the corresponding input channel can be turned off, thus permitting the remaining phone lines and input channels to continue functioning. Similarly, if the input signal level on any channel is too high or too low, such level can be easily adjusted. Because the controller can turn off all input channels except that corresponding to the currently polled remote station, inadvertent transmission by the other remote stations will not interfere with the proper receipt of information from the polled station.

Further, the present invention permits the monitoring and control of signal levels from different remote stations which are connected to a single input. For example, where a bridging system is employed at a remote station, a plurality of remote stations can be connected to a single telephone line 14. Thus, the signal level from one of the remote stations on that line can be different from the signal level of another remote station on the same line. The structure of the present invention permits controller 38 to monitor the transmission from each of the remote stations on the same line and to maintain an attenuation selection for each said remote station. Thus, depending upon which remote station is transmitting on that particular phone line, the controller 38 can adjust the attenuation provided by variable loss pad 44 accordingly.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

We claim:

1. An improved apparatus for controlling communication between a local station and a plurality of remote stations, of the type wherein the local station supplies signals to a modem which distributes the signals over a plurality of phone lines and the modem receives signals from the plurality of phone lines and supplies the signals to the local station, the apparatus of the type including a plurality of input channels each of which is associated with one of the plurality of phone lines over which signals from each phone line are supplied to the modem, a plurality of output channels each of which is associated with one of the phone lines and over which the modem broadcasts its messages to the remote stations, and a controller for communicating with the modem and the remote stations to arbitrate access to the modem by the remote stations, the improvement comprising level control means positioned in the signal path of each of the plurality of input channels for controlling the signal level of the signals being transmitted along the channels;

monitoring means coupled to each of the input channels for monitoring the level of the signals being transmitted along the channels; and selecting means receiving the signal level information from the monitoring means and coupled to the level control means for selecting the level of the signals to be provided along the input channel signal paths so that the signals provided to the modem from the input channels are maintained within a desired range of signal levels, wherein the monitoring means comprise channel selection means coupled to the selecting means and which receive the monitored signal from each of the input channels for supplying a selected one of the signals from the input channels;

means coupled to the channel selection means for measuring the signal level of the selected signal; and means for supplying the measured signal level to the selecting means.

2. The improved apparatus of claim 1 wherein the level control means include means for selectable attenuation of the signals being transmitted along the input channels.

3. The improved apparatus of claim 2 wherein the selectable attenuation means comprise a voltage divider.

4. The improved apparatus of claim 3 wherein the voltage divider provides a plurality of voltage division ratios, including a first voltage division ratio of at least minus sixty decibels;

a second voltage division ratio of approximately minus three decibels;

a third voltage division ratio of approximately zero decibels; and a fourth voltage division ration of approximately minus 6 decibels.

5. The improved apparatus of claim 2 wherein the selectable attenuation means comprise a variable loss pad.

6. The improved apparatus of claim 1 wherein the monitoring means include a variable gain amplifier which is controllable by the selecting means.

7. The improved apparatus of claim 1 wherein the measuring means comprise a peak detector.

8. The improved apparatus of claim 1 wherein the channel selection means comprise a multiplexer.

9. The improved apparatus of claim 1 wherein the supplying means comprise means for converting the measured signal level into a digital format.

10. The improved apparatus of claim 9 wherein the converting means comprise analog to digital converter means for converting the measured signal into a binary representation of the signal magnitude.

11. The improved apparatus of claim 10 wherein the analog to digital converter means comprise conversion means responsive to the measured signal for energizing one of a plurality of output lines, wherein the particular output line energized is indicative of the level of the measured signal; and means coupled to the plurality of output lines of the conversion for providing a binary signal which identifies the output line energized.

12. The improved apparatus of claim 1 further including amplifier means for modifying the signal level provided from the signal selecting means by a predetermined amount.

13. The improved apparatus of claim 12 wherein the amplifier means is coupled to the selecting means to be controllable to provide a signal gain of approximately 24dB.

14. An apparatus for coupling a plurality of phone lines to a modem comprising a plurality of input channels, each of which is coupled at one end to a different one of the phone lines and which are summed at the other end at a summing point;

a plurality of output channels, each of which is coupled at one end to a different one of the phone lines and which receive signals at the other end from the modem;

means for monitoring the level of the signals being transmitted along each input channel;

means positioned in the signal path of each input channel for modifying the level of the signals being transmitted along each input channel;

means coupled to the monitoring means and to the modifying means for controlling the modifying means as a function of the signal levels measured by the monitoring so that the signal levels being supplied to the modem from the summing point fall within a predetermined signal level range;

means coupled to the summing point for detecting the presence of a carrier signal thereon;

means for generating a carrier tone; and means receiving an input from the summing point and an input from the tone generator means and controlled by the carrier detection means, for supplying either the signal present at the summing point or the tone generator means in response to the signal from the carrier detection means, so that the modem is continuously receiving a carrier signal.

15. An improved method for controlling communication between a local station and a plurality of remote stations, of the type wherein the local station supplies signals to a modem which distributes the signals over a plurality of phone lines and the modem receives signals from the plurality of phone lines and supplies the signals to the local station, and further wherein a plurality of input channels are provided, each of which is associated with one of the plurality of phone lines over which signals from each phone line are supplied to the modem, a plurality of output channels are provided, each of which is associated with one of the phone lines and over which the modem broadcasts its messages to the remote stations, and a controller is provided for communicating with the modem and the remote stations to arbitrate access by the remote stations to the modem, the improved method comprising the steps of monitoring the level of the signals being transmitted along the input channels comprising the steps of selecting one of the signals from the input channels; and measuring the signal level of the selected signal;

comparing the monitored signal level to a desired range of signal levels; and controlling the signal level of the signals being transmitted along the channels so that the signals provided to the modem from the input channels are maintained within the desired range of signal levels.

16. The improved method of claim 15 wherein the controlling step includes the step of selectably attenuating of the signals being transmitted along the input channels.

17. The improved method of claim 16 wherein the attenuating comprises the step of applying the signals to a voltage divider.

18. The improved method of claim 15 wherein the measuring step comprises the step of applying the signal to be measured to a peak detector.

19. An improved apparatus for controlling communication between a local station and a plurality of remote stations, of the type wherein the local station supplies signals to a modem which distributes the signals over a plurality of phone lines and the modem receives signals from the plurality of phone lines and supplies the signals to the local station, the apparatus of the type including a plurality of input channels each of which is associated with one of the plurality of phone lines over which signals from each phone line are supplied to the modem, a plurality of output channels each of which is associated with one of the phone lines and over which the modem broadcasts its messages to the remote stations, and a controller for communicating with the modem and the remote stations to arbitrate access to the modem by the remote stations, the improvement comprising level control means positioned in the signal path of each of the plurality of input channels for controlling the signal level of the signals being transmitted along the channels;

monitoring means coupled to each of the input channels for monitoring the level of the signals being transmitted along the channels;

selecting means receiving the signal level information from the monitoring means and coupled to the level control means for selecting the level of the signals to be provided along the input channel signal paths so that the signals provided to the modem from the input channels are maintained within a desired range of signal levels;

means for generating a carrier tone; and means coupled to the input channels and receiving the carrier tone from the tone generator means, for supplying either the signal from the input channels or the generated carrier tone to the modem as a function of the presence of a carrier signal on the input channels.

* * * * *